June 17, 1941.   B. B. WEAVER   2,245,884
CULTIVATOR
Filed March 7, 1939   2 Sheets-Sheet 1

Inventor
Benjamin B. Weaver
By Frease and Bishop
Attorneys

Inventor
Benjamin B. Weaver
By Frease and Bishop
Attorneys

Patented June 17, 1941

2,245,884

UNITED STATES PATENT OFFICE 2,245,884

CULTIVATOR

Benjamin B. Weaver, Mount Hope, Ohio

Application March 7, 1939, Serial No. 260,349

6 Claims. (Cl. 97—149)

My invention relates generally to horse drawn agricultural implements and more particularly to an improved hitch and draft construction for cultivators of the straddle-row type.

In most prior cultivators of this type the hitch connection is made intermediate the ends of draft levers depending from the ends of an evener bar pivoted on the tongue.

With these prior constructions it is difficult to balance the cultivator, especially when working in hard soil, because the front end of the tongue tends to be thrown downwardly, greatly increasing the neck load on the horses.

Moreover, where the hitch connection is made intermediate the ends of the depending draft levers, the connection is considerably above the line of draft extending from the cultivator shovels to the horses' shoulders, thereby reducing the effectiveness of the draft or pull on the shovels.

Furthermore, connecting the draft levers directly to the evener bar and making the hitch connection intermediate the ends of said draft levers not only allows a small range of adjustment for equalizing the draft between the horses, but locates the hitch connection a substantial distance forwardly of the cultivator, thereby requiring a longer hitch.

It is therefore a general object of the present invention to provide an improved cultivator construction which will overcome all of the foregoing disadvantages, and which will provide additional novel and advantageous features.

A more specific object is to provide for substantially automatic balancing of the cultivator during its use in cultivating the soil.

Another object is to provide for locating the hitch connection substantially in the line of draft from the cultivator shovels to the horses to obtain maximum effectiveness of the draft.

A further object is to arrange the draft levers and their connections with the evener bar in such a way as to greatly increase the amount of adjustment of draft or permissible variation of distance between the horses, before the pull is transmitted to the cultivator.

Another object is to provide for making the hitch connection closely adjacent to the cultivator, thereby reducing the length of the hitch required.

A still further object is to provide for a straight forward pull on the draft levers and evener bar when the cultivator wheels are turned as well as when they are straight, thereby promoting maximum effectiveness of the draft at all times.

And finally, it is an object of the present invention to embody all of the foregoing advantageous features in a simple and efficient construction which is inexpensive to manufacture and easy to use for attaining the aforesaid objects.

These and other objects are attained by the parts, elements, arrangements, combinations and sub-combinations comprising the novel and useful improvements of the present invention, which is illustrated by way of example in the accompanying drawings and hereinafter described and claimed.

In general terms the invention may be stated as including a cultivator having the usual gang beams carrying the cultivator shovels on their horizontal portions and being upwardly angled at their front ends, the upright draft levers being pivoted near their upper ends on the front ends of the gang beams and the lower ends of the draft levers being located in the line of draft extending between the shovels and the horses, singletrees connected to the lower ends of said draft levers, and means connecting the upper ends of the draft levers with the ends of the evener bar, said evener bar being supported preferably by said gang beams in such a way as to permit lateral movement of the evener bar relative to the tongue of the cultivator.

Referring to the drawings in which the invention is shown embodied in a cultivator Figure 1 is a fragmentary perspective view of a cultivator embodying the present invention, certain portions of the conventional frame and superstructure having been removed for the sake of clearness;

Similar numerals refer to similar parts throughout the several views of the drawings.

Figure 1:
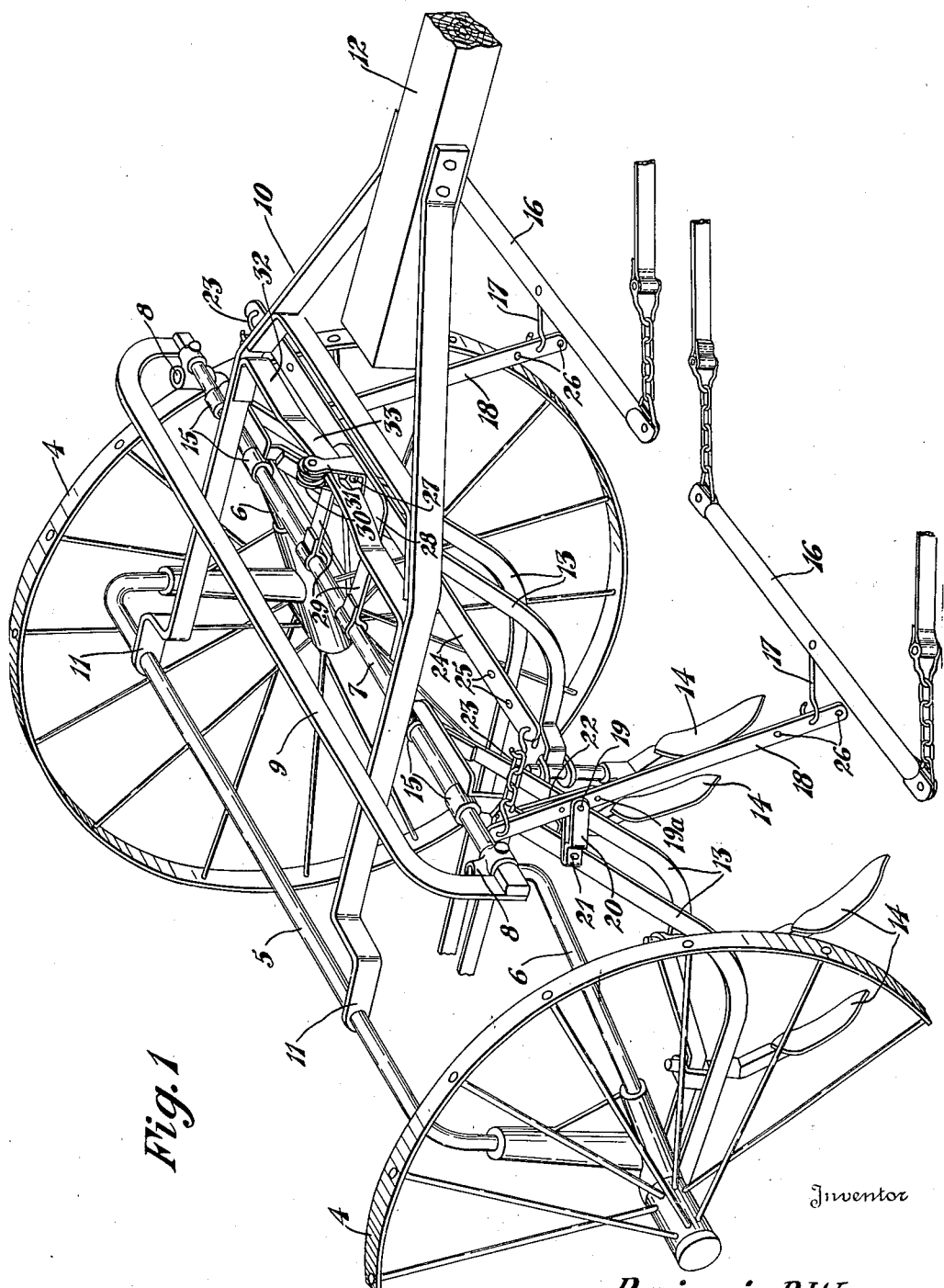

While I have shown my invention embodied in a straddle-row cultivator, by way of example, it is understood that the invention may be embodied in various other agricultural implements, without departing from the scope of the invention defined in the appended claims.

As shown on the drawings, the cultivator includes two wheels 4 journaled on the ends of a transverse U-shaped axle member 5 in a usual manner. Forwardly extending upwardly inclined supporting bars 6, mounting the gang beams which carry the plows or cultivator shovels, are pivotally connected to the axle member 5 at the wheel hubs.

Preferably, the front ends of the supporting bars 6 are connected together by a laterally extending bar 7 and the supporting bars 6 preferably have vertical pivot connections 8 with the end portions of the laterally extending bar 7, so that the bar 7 always remains parallel to the horizontal portion of the axle member 5 but can move laterally when the wheels 4 are turned to swing the supporting arms 6 and turn them in the vertical pivots 8.

Preferably a U-shaped stiffener bar 9 is secured to the outer ends of the laterally extending bar 7 at points just beyond the pivots 8, and the stiffener bar 9 is upwardly arched to permit a tongue frame indicated generally at 10 to extend between the stiffener bar and the bar 7, the frame being secured to the axle member 5 in any suitable fashion as indicated at 11.

At its forward end the frame 10 is secured to the forwardly extending tongue 12 in a usual manner as shown, and the frame is arranged to carry the operator's seat and certain gang beam operating mechanism (not shown), which is of well known construction and constitutes no part of the present invention.

The usual pairs of gang beams are indicated at 13 and each pair has a plurality of cultivator shovels 14 mounted thereon, the rear portions of the gang beams carrying the shovels being substantially horizontal and their front portions being upwardly curved or inclined, as shown, toward their front ends 15 which are hinged on the laterally extending bar 7 connecting the inclined supporting arms 6. Preferably, the gang beams 13 are slidable longitudinally of the bar 7, so that the pairs of gangs can be adjusted laterally of the cultivator and laterally with respect to each other.

The parts of the cultivator thus far described are conventional and well known, and per se form no part of the present improvements.

My invention relates more particularly to the hitch construction and the arrangement and mounting of the various draft members associated with the hitch, as exemplified in connection with the cultivator shown in the drawings.

According to my improvements the singletrees 16 are pivotally connected by hooks 17 to the lower ends of upright draft levers 18. The upright draft levers 18 are pivoted near their upper ends on the gang beams 13, being preferably pivoted at 19 on the open ends of brackets or yokes 20 each secured at their closed ends 21 to one of the gang beams and rigidly mounted on said gang beam by a brace 22 secured to its open end.

Preferably, the draft levers 18 and the braces 22 are provided with a series of holes 19a for adjusting the pivotal connection 19 with yoke 20, so as to vary the penetrating effect of the shovels 14 in the soil.

The upper ends of the draft levers 18 are connected preferably by chain links 23 to the ends of an evener bar 24 pivoted midway of its ends in a manner to be described. Preferably the ends of the evener bar are provided with series of holes 25 for selective connection with the chain links 23 when the gang beams 13 are adjusted laterally of the cultivator on the laterally extending cross bar 7.

Figure 3:
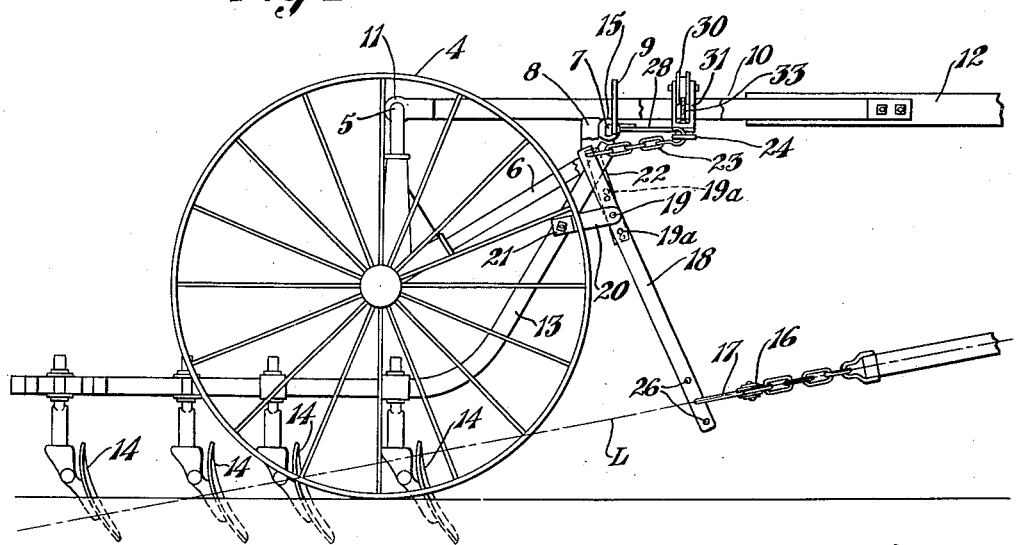
Fig. 3 is a side elevation thereof.

The lower or depending ends of the draft levers 18 are located close to the ground so that the line of draft extending between the cultivator shovels and the horses pulling the cultivator extends through the lower ends of said draft levers 18, the line of draft being indicated at L in Fig. 3. This construction provides for obtaining maximum effectiveness of draft, especially when working in hard soil, and substantially provides for automatic balance of the cultivator, because since the pull or draft is directly on and in line with the shovels, the tongue 12 tends to remain substantially horizontal and is not thrown downwardly to increase the neck load on the horses.

The lower ends of the draft levers are preferably provided with series of holes 26 for selective connection with the singletree hooks 17, so that the hitch connection can be adjusted upwardly or downwardly to compensate for changes in soil conditions.

Moreover, pivoting the draft levers 18 on the gang beams provides for making the hitch connections therewith closely adjacent to the cultivator, thereby requiring a relatively short hitch.

By pivoting the draft levers 18 near their upper ends, any movement of the lower ends of the levers and the singletrees connected thereto produces a much smaller movement of the ends of the evener bar, in direct proportion to the relative distances between the pivots 19 and the upper and lower ends of the draft levers. Consequently the permissible variation between the forward positions of the horses is greatly increased, because one horse may advance considerably ahead of the other before the evener bar becomes locked and the pull of the forward horse transmitted to the cultivator to any extent.

Because of the relatively small amount of movement required of the evener bar 24 to equalize the draft between the horses, the evener bar can be mounted closely adjacent to the cultivator as shown, and is not required to be mounted on the tongue at a distance considerably in front of the cultivator proper.

In the present embodiment the evener bar 24 is shown pivoted at 27 on the forward end of a plate 28 which has rearwardly extending arms 29 hinged on the laterally extending bar 7.

Means for movably supporting the plate 28, and the evener bar 24 pivoted thereto, on the frame 10 preferably includes a roller 30 journaled in an upstanding bracket 31 secured on plate 28, and arranged to roll on the upper edge of a frame cross member 32 having a slightly curved central portion 33 on which the roller 30 rolls, as shown.

This means of movably mounting the evener bar on the frame provides for a straight forward pull between the draft levers and the evener bar even though the wheels of the cultivator are turned somewhat relative to the longitudinal alignment of the tongue of the cultivator, as for example when the operator turns his wheels to follow the crop rows being cultivated.

Figure 2:
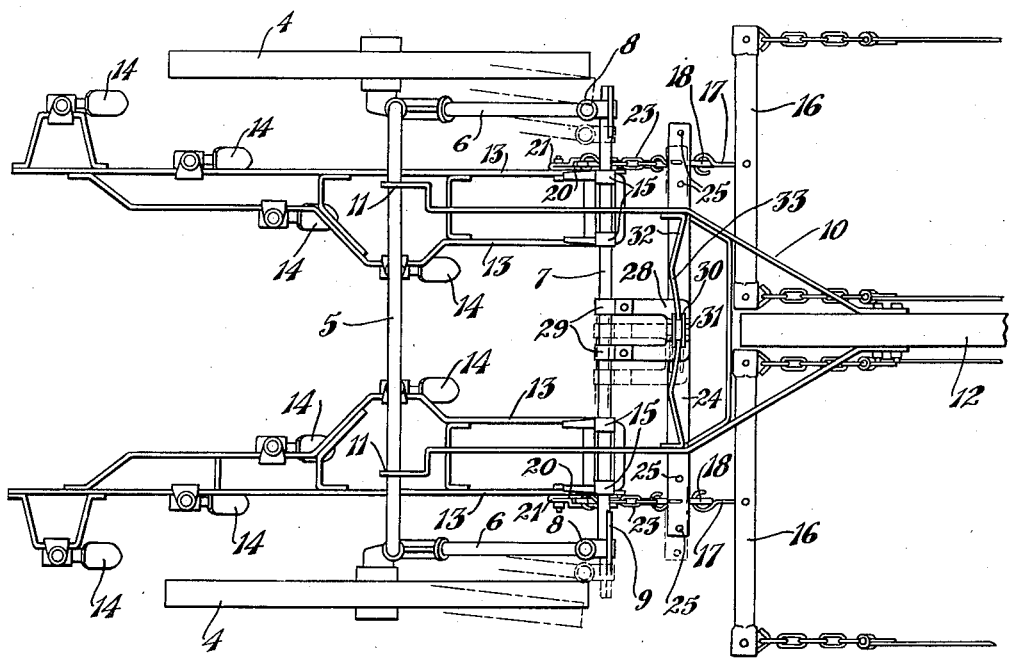
Fig. 2 is a fragmentary plan view of the cultivator as shown in Fig. 1.

As shown in Fig. 2, the wheels 4 in their full line positions are aligned with tongue 12, but if the wheels are turned as indicated in dot-dash lines, the laterally extending bar 7 shifts laterally on the pivots 8 thereby laterally shifting the plate 28 and evener bar 24, the roller 30 rolling on the curved portion 33 of the frame cross member 32 and permitting lateral movement of the evener bar relative to the frame.

Thus when the laterally extending bar 7 and the gang beams 13 carried thereby are shifted laterally resulting in lateral shifting of the draft levers 18, the evener bar 24 shifts correspondingly relative to the tongue and frame so as to always maintain the chain links 23 longitudinally aligned with the pull on the draft levers.

The present invention constitutes a simple and efficient construction which is inexpensive to manufacture and easy to use, and which overcomes the disadvantages had with prior construction.

Various modifications in details of construction and arrangement are contemplated within the scope of the invention defined in the appended claims.

I claim:

1. In a cultivator including laterally spaced longitudinally extending gang beams carrying cultivator shovels and having upwardly directed front ends, a laterally extending bar connecting the front ends of said gang beams, an evener bar located in front of and supported on said laterally extending bar, upright draft levers pivoted near their upper ends on said gang beam front ends, link means connecting the upright ends of said draft levers with the ends of said evener bar, and hitch connections at the lower ends of said draft levers.

2. In a cultivator including laterally spaced longitudinally extending gang beams carrying cultivator shovels and having upwardly angled front ends, a laterally extending bar connecting the front ends of said gang beams, a plate mounted on said laterally extending bar and extending forwardly thereof, an evener bar pivoted on said plate, upright draft levers pivoted near their upper ends on said gang beam front ends, link means connecting the upright ends of said draft levers with the ends of said evener bar, and hitch connections on the lower ends of said draft levers.

3. In a cultivator including laterally spaced longitudinally extending gang beams carrying cultivator shovels and having upwardly directed front ends, a laterally extending bar connecting the front ends of said gang beams, a plate mounted on said laterally extending bar and projecting forwardly thereof, an evener bar pivoted on said plate, a tongue, a frame connected to said tongue and having a cross member, means mounting said plate on said cross member for lateral movement relative thereto, upright draft levers pivoted near their upper ends on said gang beam front ends, link means connecting the upright ends of said draft levers with the ends of said evener bar, and the lower ends of said upright levers being located near the ground and having hitch connections thereon.

4. In a cultivator including laterally spaced longitudinally extending gang beams carrying cultivator shovels and having upwardly angled front ends, a lterally extending bar connecting the front ends of said gang beams and having its ends projecting outwardly therefrom, axle members pivotally connected with the projecting ends of said laterally extending bar, wheels journaled on said axle members, a plate mounted on said laterally extending bar and extending forwardly thereof, an evener bar pivoted on said plate, upright draft levers pivoted near their upper ends on the gang beam front ends, link means connecting the upper ends of said draft levers with the ends of said evener bar, and hitch connections at the lower ends of said draft levers.

5. In a cultivator including laterally spaced longitudinally extending gang beams carrying cultivator shovels, a laterally extending bar connecting the front ends of said gang beams and having its ends projecting outwardly therefrom, axle members pivotally connected with the projecting ends of said laterally extending bar, wheels journaled on said axle members, a tongue frame having a cross member, an evener bar pivotally supported on said laterally extending bar, means supporting said evener bar on said frame cross member for lateral movement relative thereto, upright draft levers pivotally mounted near their upper ends on said gang beams, link means connecting the upper ends of said draft levers with the ends of said evener bar, and the lower ends of said upright levers being located near the ground and having hitch connections thereon.

6. In a cultivator including laterally spaced longitudinally extending gang beams carrying cultivator shovels, a laterally extending bar connecting the front ends of said gang beams and having its ends projecting outwardly therefrom, axle members pivotally connected with the projecting ends of said laterally extending bar, wheels journaled on said axle members, an evener bar located forwardly of said laterally extending bar and pivotally supported thereon, a tongue frame having a cross member, means movably mounting said evener bar on said cross member, depending draft levers pivoted near their upper ends on said gang beams, link means connecting the upper ends of said draft levers with the ends of said evener bar, and hitch connections at the lower ends of said draft levers located substantially in the line of draft extending forwardly from said cultivator shovels.

BENJAMIN B. WEAVER.